(12) United States Patent
Jia et al.

(10) Patent No.: US 7,913,632 B2
(45) Date of Patent: Mar. 29, 2011

(54) COMBUSTION METHOD AND SYSTEM

(75) Inventors: Zhen Jia, Beijing (CN); Taofang Zeng, Raleigh, NC (US); Xiaoguang Jia, Beijing (CN); Xing Li, Beijing (CN)

(73) Assignee: Clean Combustion Technologies LLC, Raleigh, NC (US)

( * ) Notice: Subject to any disclaimer, the term of this patent is extended or adjusted under 35 U.S.C. 154(b) by 363 days.

(21) Appl. No.: 11/283,930

(22) Filed: Nov. 22, 2005

(65) Prior Publication Data

US 2006/0191451 A1 Aug. 31, 2006

(30) Foreign Application Priority Data

Feb. 25, 2005 (CN) ................... 2005 2 0005019 U

(51) Int. Cl.
*F23D 1/00* (2006.01)
(52) U.S. Cl. ...................... 110/347; 110/265
(58) Field of Classification Search .............. 431/8–10, 431/284; 110/185–190, 261–265
See application file for complete search history.

(56) References Cited

U.S. PATENT DOCUMENTS

| | | | | |
|---|---|---|---|---|
| 4,627,366 A | * | 12/1986 | LaRue et al. ............. | 110/263 |
| 4,741,279 A | | 5/1988 | Azuhata et al. | |
| 4,798,330 A | * | 1/1989 | Mancini et al. ........... | 239/8 |
| 4,942,832 A | | 7/1990 | Finke | |
| 5,355,814 A | * | 10/1994 | Kemori et al. ............ | 110/265 |
| 5,626,085 A | | 5/1997 | Donais et al. | |
| 5,709,541 A | * | 1/1998 | Gensler et al. ............ | 431/10 |
| 6,206,949 B1 | | 3/2001 | Kobayashi et al. | |
| 6,659,026 B1 | | 12/2003 | Hendricks et al. | |
| 6,699,031 B2 | | 3/2004 | Kobayashi et al. | |
| 6,715,432 B2 | | 4/2004 | Tsumura et al. | |

FOREIGN PATENT DOCUMENTS

| | | |
|---|---|---|
| CN | 88214735.8 | 4/1989 |
| CN | 91217302.5 | 5/1992 |
| CN | 96211723.4 | 6/1997 |
| CN | 96211946.6 | 1/1998 |

OTHER PUBLICATIONS

Kecoba, "Application of High-Concentration Coal Stream", The Translation Series for Thermal Power Generation, 1990 No. 6 and 1991 No. 3.
Richards, "Ultra Low $NO_x$ Integrated System for $NO_x$ Emission Control From Coal-Fired Boilers", Final Report, Dec. 30, 2002, pp. 1-190.
Kenneth B. Rinehart, "International Search Report and Written Opinion of the International Search Authority," International Patent Application No. PCT/US06/07025 (filed Feb. 27, 2006), Jul. 31, 2006, 7 pages, Commissioner of Patents, U.S.A.
International Search Report for PCT/US06/07025, filed Feb. 27, 2006, mailed Jul. 31, 2007, 10 pgs.

* cited by examiner

*Primary Examiner* — Kenneth B Rinehart
(74) *Attorney, Agent, or Firm* — Squire, Sanders & Dempsey (US) LLP

(57) ABSTRACT

A method of combustion for pulverized hydrocarbonaceous fuel includes injecting a concentrated fuel and air stream into a burner, causing a low-pressure zone; directing a flow of a high-temperature combustion gas from a combustion chamber into the low-pressure zone in the burner; mixing the high-temperature combustion gas with the injected concentrated stream to heat the injected concentrated stream; injecting the heated concentrated stream from the burner to the combustion chamber, wherein the concentrated stream is rapidly devolatilized and combusted in a flame that has a fuel-rich flame zone; sensing a combustion parameter; and, based on the sensed combustion parameter, controlling combustion to achieve at least one of a desired NOx reduction and a desired distance from the burner to a flame front.

37 Claims, 6 Drawing Sheets

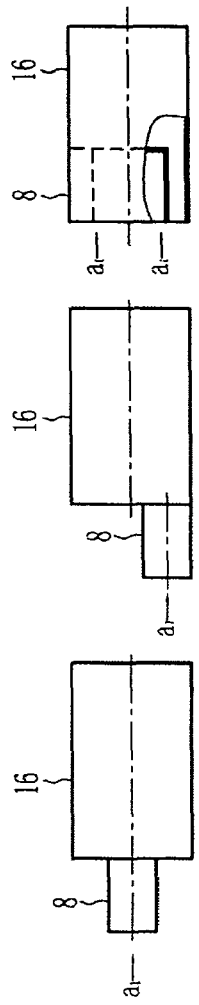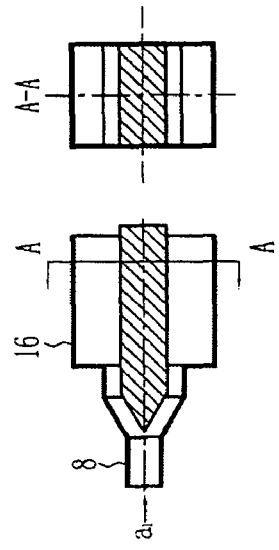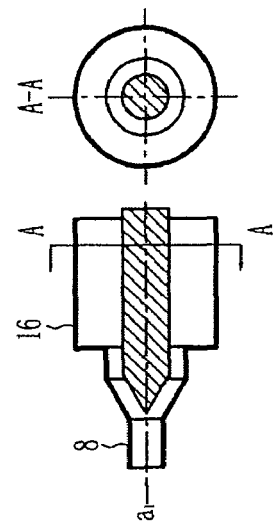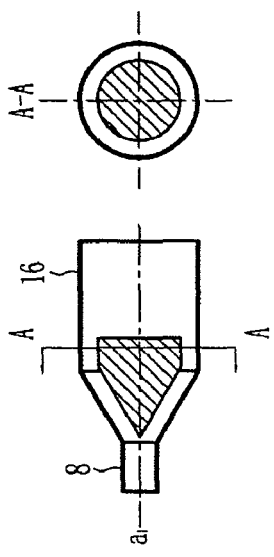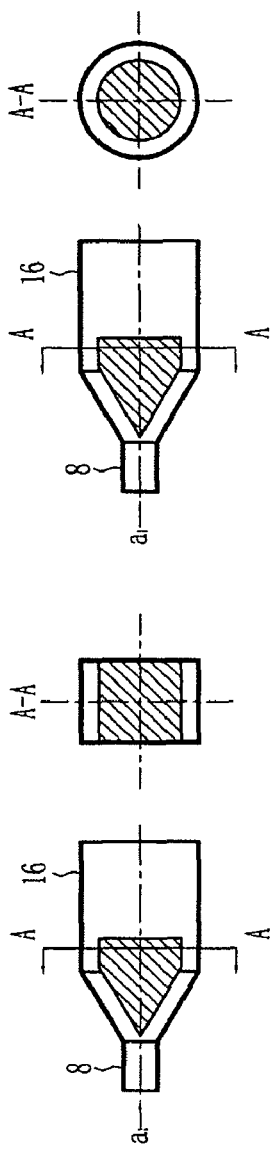

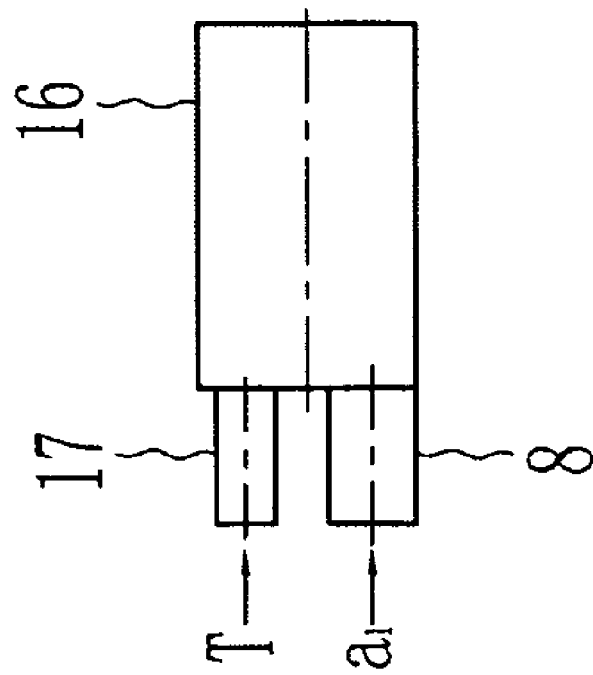
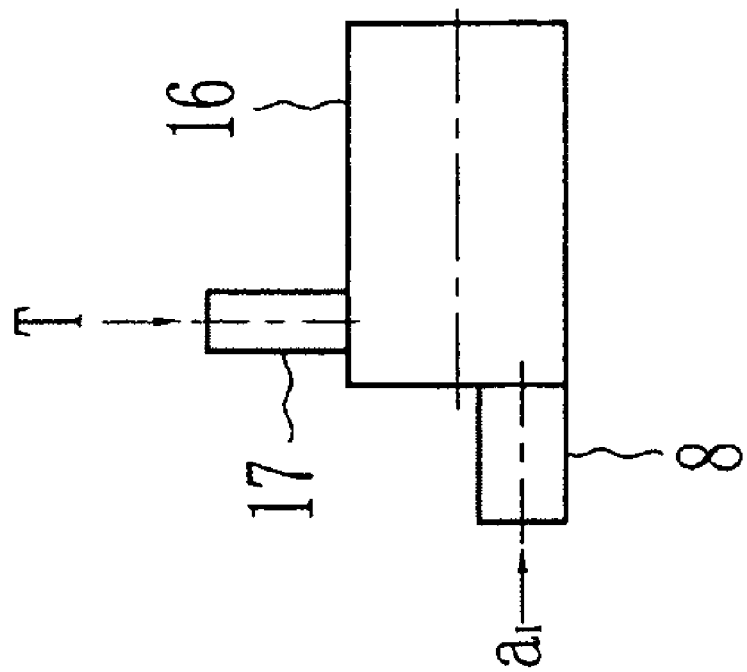

COMBUSTION METHOD AND SYSTEM

TECHNICAL FIELD OF THE INVENTION

The present invention relates to a combustion method, and a combustion system, for solid hydrocarbonaceous fuel.

BACKGROUND OF THE INVENTION

Solid fossil fuel, such as coal, is an important energy source, particularly for power generation. Pollutants emitted from coal combustion, however, are a major source of air pollution. Of the pollutants from coal combustion, nitrogen oxides (NOx) have attracted extensive attention.

There are two primary sources of NOx generated during combustion: fuel NOx and thermal NOx. Fuel NOx is NOx formed due to the conversion of chemically bound nitrogen (fuel nitrogen). Fuel nitrogen (or char-N) is released in several complex processes. The primary initial product of combustion is either HCN or NH3. HCN is either oxidized to NO or reduced to $N_2$. If the gases are oxidant or the fuel is lean, NO will be the dominant product of fuel nitrogen. If it is fuel rich, HCN is reduced to $N_2$ by CO or C (char) on the coal char surface.

Thermal NOx refers to NOx formed from high temperature oxidation of atmospheric nitrogen. Thermal NOx formation is an exponential function of temperature and a square root function of oxygen concentration. A lower combustion temperature or a lower oxygen concentration yields a lower NOx. Therefore, the production of thermal NOx can be controlled by controlling the reaction temperature or the oxygen concentration. However, a lower combustion temperature or a lower oxygen concentration leads to an inefficient burning of coal, i.e., a slow burning rate. A slow burning rate may result in an incomplete burning of coal and a prolonged burning of coal.

Various technologies have been developed to reduce NOx emission. These technologies either reduce the combustion temperature or manipulate the oxygen concentration. The first is called "dilution based combustion control technique," and the latter is referred to as "stoichiometry based combustion control technique." The dilution based combustion technique introduces inert gases such as water or flue gases to reduce the flame peak temperature. The stoichiometry based combustion technique involves lowering the oxygen concentration in the flame zone and generating a reducing atmosphere, thus allowing NOx to be reduced. Examples are low-NOx staged burners and OS combustion, e.g., over-fire-air and burner-out-of-service. These techniques control NOx generation by providing air staging to create an initial fuel-rich zone (partial combustion zone) followed by an air-rich zone to complete the combustion process. These low-NOx burners can reduce the NOx emission to 0.65 to 0.25 pounds per million BTUs. Another type of NOx control technology is gas reburning. The reburning technology can lower the NOx emission to 0.45 to 0.18 pounds per million BTUs.

However, these NOx reduction techniques are less than adequate. For example, they cannot meet the emission requirements (less than 0.15 pounds per million BTUs) under the U.S. Clean Air Act. Additionally, in almost all low-NOx combustion techniques, the combustion time has to be increased significantly. As a result, the boiler size must be increased to accommodate the long combustion time so that coal combustion can be completed at an economically acceptable level. Consequently, almost all the NOx control technologies require significant capital investment, and the cost of operation is high.

Recent studies have shown that feeding coal with high-temperature gas could significantly reduce NOx emission and unburned carbon in fly ash. In the combustion process with high-temperature gas, the fuel nitrogen is devolatilized rapidly, and reduced to nitrogen during devolatilization and combustion in a fuel rich zone.

SUMMARY OF THE INVENTION

The present invention is based on the inventors' recognition of several problems associated with the prior art. One of the problems is that although the prior art technologies for reducing NOx are based on solid theories, the devices based on the technologies often do not achieve optimum NOx reduction. The reason is that those devices do not, or cannot quickly, adjust operating parameters to adapt to changing operating conditions for optimum NOx reduction. For example, when the quality or type of coal changes or when the load is changed, the prior art devices do not, or cannot quickly, recognize the change and adjust the operating parameters to adapt to the change. As a result, an optimum NOx reduction cannot be achieved for the coal being used. At the same time, unburned carbon in fly ash also increases.

Another problem associated with the prior art is that, in the case of the technology involving feeding high-temperature gas to coal, which produces high combustion temperature, the failure to adjust operating parameters to adapt to changing operating conditions may result in the flame front becoming too close to the wall of the burner and/or the wall of the combustion chamber, causing slagging to take place to the wall of the burner and/or the wall of the combustion chamber. For example, the inventors' experiment shows that when the operating parameters are set for anthracite coal (with volatile of 7.36%) but bituminous coal (with volatile of 17.22%) is used, slagging takes place on the wall of the burner due to over-heating and can cause a shout-down of the combustion system.

The present invention is directed to a method of combustion that has one or more features of low NOx emission, low unburned carbon, automatic adaptability to any types of fossil fuel by highly concentrating the fuel stream, rapid heating the concentrated fuel stream to a high temperature, and reduced slagging. The combustion method may include injecting a concentrated fuel and air stream into a burner, causing a low-pressure zone; directing a flow of a high-temperature combustion gas from a combustion chamber into the low-pressure zone in the burner; mixing the high-temperature combustion gas with the injected concentrated stream to heat the injected concentrated stream, and injecting the heated concentrated stream from the burner to the combustion chamber, wherein the concentrated stream is rapidly devolatilized and combusted in a flame that has a fuel-rich flame zone; sensing a combustion parameter; and based on the sensed combustion parameter, controlling the combustion to achieve at least one of a desired NOx reduction and a desired distance from the burner to a flame front. In a preferred embodiment, the combustion is controlled to maximize NOx reduction without impermissible slagging. What constitutes "impermissible slagging" cannot be determined in the abstract and must be determined on a case-by-case basis from the design requirements for a given combustion system.

The present invention is directed also to a combustion system for pulverized hydrocarbonaceous fuel. A combustion system may include a burner that is to receive a concentrated fuel and air stream; a combustion chamber that is connected to the burner to send to the burner a flow of a high-temperature combustion gas to heat the concentrated stream, and to receive the heated concentrated stream form the burner for combustion; a sensor for sensing a combustion parameter; and a controller for controlling the combustion based on the sensed combustion parameter to achieve at least one of a desired NOx reduction and a desired distance from the burner to a flame front. In a preferred embodiment, the combustion is controlled to maximize NOx reduction without impermissible slagging.

In a preferred embodiment, the velocity of the injected concentrated stream in the burner is 10 to 60 m/sec, more preferably 15 to 50 m/sec. The velocity can be designed so as to feed the concentrated stream without blocking the feed pipe, and to introduce a pressure inside the burner that is lower than that in the combustion chamber. The cross-sectional area of the injection at the entrance of the burner may be a fraction of the cross-sectional area of the burner, preferably 20% to 60%. The desirable ratio of the two cross-sectional areas allows a certain amount of high-temperature combustion gas to flow back into the burner from the combustion chamber.

The ratio of air to fuel solids in the concentrated stream preferably is 0.4 to 2.2 kg air/1 kg fuel, more preferably 0.7 to 1.8 kg air/1 kg fuel. This represents only 8% to 25% of the stoichiometric ratio for fuels such as anthracite and bituminous coals.

There are several reasons for the use of a concentrated fuel and air stream. First, the concentrated stream allows the maintenance of a highly fuel-rich flame inside the burner and combustion chambers, which can significantly reduce the NOx. Secondly, the concentrated stream can be heated up using a relatively small amount of heat. Thus the concentrated stream can be quickly heated up in a short distance. Third, the heated concentrated stream releases a large amount of volatiles in the fast heating. (Partial combustion also may take place during the heating of the concentrated stream.) The released volatiles enhance the ignition and combustion of the coal particles, reducing the unburned carbon in fly ash. Additionally, a fast release of volatiles including fuel-bound nitrogen in the fuel rich atmosphere allows transformation of the fuel-bound nitrogen into $N_2$ rather than NOx. The overall effects of the concentrated fuel stream and the designed burner allow combustion to be performed and maintained at a high temperature and in an atmosphere of reduced gases, which is conductible to ultra-low NOx emission and low unburned carbon in fly ash.

The fuel and air stream in the burner can be a swirling flow or a straight flow. Some typical setups of the burner are wall fired, opposite fired, tangential fired, and down-fired. The burner preferably is arranged at the same vertical elevation in the combustion chamber.

In another preferred embodiment of the present invention, the combustion system may include a separating device that is designed to separate a primary fuel and air stream from a pulverizing system into the concentrated fuel and air stream and a diluted fuel and air stream. The separating device is connected to the burner to supply the concentrated stream to the burner. The ratio of fuel solids to air for the concentrated stream is higher than that for the diluted stream. In general, the ratio of air to the fuel solids in the primary fuel and air stream preferably is 1.25 to 4.0 kg air/1 kg fuel. The ratio of air to fuel solids in the concentrated stream preferably is 0.4 to 2.2 kg air/1 kg fuel, more preferably 0.7 to 1.8 kg air/1 kg fuel.

In still another preferred embodiment, the diluted fuel stream is fed from a source other than the burner into a region outside the fuel-rich flame zone to establish a fuel rich primary combustion zone. In some embodiments, the amount of the diluted fuel stream may contain sufficient oxygen that the total amount of oxygen fed into the combustion chamber makes up at least the stoichiometric amount needed for a complete combustion of fuel.

In yet another preferred embodiment, a secondary air and fuel stream, which preferably contains 65% to 90% of stoichiometric air, may be fed into the combustion chamber to complete combustion. Preferably, the secondary air and fuel stream is fed into the combustion chamber adjacent to the periphery of the exit of the burner for the concentrated stream. A typical secondary air and fuel stream contains about 3.5 to 8.0 kg of air for 1 kg of fuel, which represents about 65 to 90% of the stoichiometric combustion air required for a complete combustion of anthracite, bituminous coals and oil coke.

In a further preferred embodiment, air is added from a source other than the burner and the port for the diluted fuel stream into a region in the combustion chamber away from the fuel-rich flame to establish an overall fuel-rich combustion zone in the combustion chamber. In some embodiments, the amount of the air contains at least sufficient air such that the total amount of air fed into the combustion chamber is at least the stoichiometric amount for complete combustion of fuel. This air is called "over-fire air."

The controlling of combustion to optimize at least one of NOx reduction and the distance from the burner to a flame front may be carried out in several ways. For example, it may include controlling one or more of the following control parameters: the pressure in the low-pressure zone, at least one of the flow rate and concentration of the injected concentrated fuel and air stream, at least one of the flow rate and concentration of the diluted fuel and air stream, at least one of the flow rate and concentration of a secondary air and fuel stream, and an over-the-fire air. In general, an effective way for combustion control is to control the heating of the concentrated stream.

Combustion control can be achieved by controlling the pressure in the low-pressure zone, because the pressure in the low-pressure zone affects the flow rate of the high-temperature combustion gas from the combustion chamber into the low-pressure zone in the burner and, thus, the heating of the concentrated stream. The pressure in the low-pressure zone can be controlled by introducing a gas into the low pressure reflow zone. Preferably, the gas is air (tertiary air). When the quantity of tertiary air is increased, the pressure in the low-pressure zone is also increased, resulting in a decreased flow of the high-temperature combustion gas from the combustion chamber into the low-pressure zone. As a result, the heating of the concentrated stream is reduced, and combustion temperature may be reduced. The amount of tertiary air affects also the air/fuel weight ratio of the concentrated stream, which can also be used for combustion control.

Combustion control may also be achieved by controlling the flow rate and/or concentration of the concentrated stream injected into the burner, because the flow rate and/or concentration of the concentrated stream affect the pressure in the low-pressure zone and the devolatilization and combustion of the concentrated stream.

Similarly, the flow rate and/or concentration of the diluted fuel and air stream and of a secondary air and fuel stream can also be used for combustion control, because they affect the combustion conditions.

The combustion control of the present invention can be based on a combustion parameter. Representative parameters may be combustion temperature, pressure, and the concentration of one or more selected gases such as carbon dioxide, carbon monoxide, oxygen and nitrogen. Preferably, the temperature is used as the combustion parameter. The control may be realized by sensing the value of the combustion parameter inside the burner and/or the combustion chamber, and comparing the sensed value with a preset value. Based on the difference between the sensed value and preset value, the controller, such as a close-loop controller or a distributed control system, adjusts one or more of the above-discussed control parameters to reduce the difference. When the difference is reduced, the NOx emission is reduced, and/or a desired distance from the burner to a flame front is maintained to reduce slagging. This automatic control enables a burner to be used with almost all kinds of fuel without changing the structure of the combustion system.

Herein, the term "reflow" means a flow of the high-temperature combustion gases from the combustion chamber back to the burner. The flow of the combustion gases is in the opposite direction of the fuel stream. Other terms for such types of flow are "reflux" and "recirculation." The reflow is caused by the pressure difference resulted from the injection of the concentrated fuel stream.

Herein, the term "heating" means heating of the fuel stream in the burner. The heating source is from the reflow of the high-temperature combustion gases. The heating may be conducted by mixing and thermal radiation. As the concentrated fuel stream has a smaller fraction of air than a conventional primary fuel stream, heating by the reflowed gases is fast, and the temperature of the fuel stream may reach 700 C. to 1200 C. in a distance ranging between 250 mm and 1950 mm measured from the exit of the feeding pipe for the concentrated fuel stream to the burner.

Herein, the term "NOx" means oxides of nitrogen, including NO, $NO_2$, $NO_3$, $N_2O$, $N_2O_3$, $N_2O_4$, $N_3O_4$, and their mixtures.

Herein, the term "bound nitrogen" means nitrogen that is a composition of a molecule that composes of carbon and hydrogen and possibly oxygen.

Herein, the term "over-fire-air" means the additional air that is needed to at least complete the combustion of the fuel.

Herein, the term "tertiary air" means the air flowing into the low pressure reflow zone of the burner from a pipe other than the feed pipes for the concentrated fuel stream and the secondary air and fuel stream. It is used to adjust the heating and the weight ratio of fuel/air in the burner.

BRIEF DESCRIPTION OF THE DRAWINGS

FIGS. 5 and 6 show cross-sectional representations of devices used in the present invention for feeding a concentrated fuel stream to the combustion chamber, for creating reflow of high-temperature combustion gases back into the burner, and for controlling the re-flow of high-temperature combustion gases back into the burner.

DETAILED DESCRIPTION OF PREFERRED EMBODIMENTS

The preferred embodiments of the present invention described below are discussed sometimes in terms of coal combustion, and in terms of air being the gaseous carrier and oxidant. The techniques described are applicable to any other pulverized solid fuel and any other gaseous carrier. The invention will be described with the aid of the Figures, yet a description that refers to the Figures is not used to limit the scope of the invention.

FIG. 1 to 4 show an embodiment of a swirling burner according to the present invention. Some embodiments of the burner are described in more detail in FIGS. 4 and 5. The invention also encompasses straight-flow burners where the secondary stream is fed into the combustion chamber in a straight flow.

Figure 1:
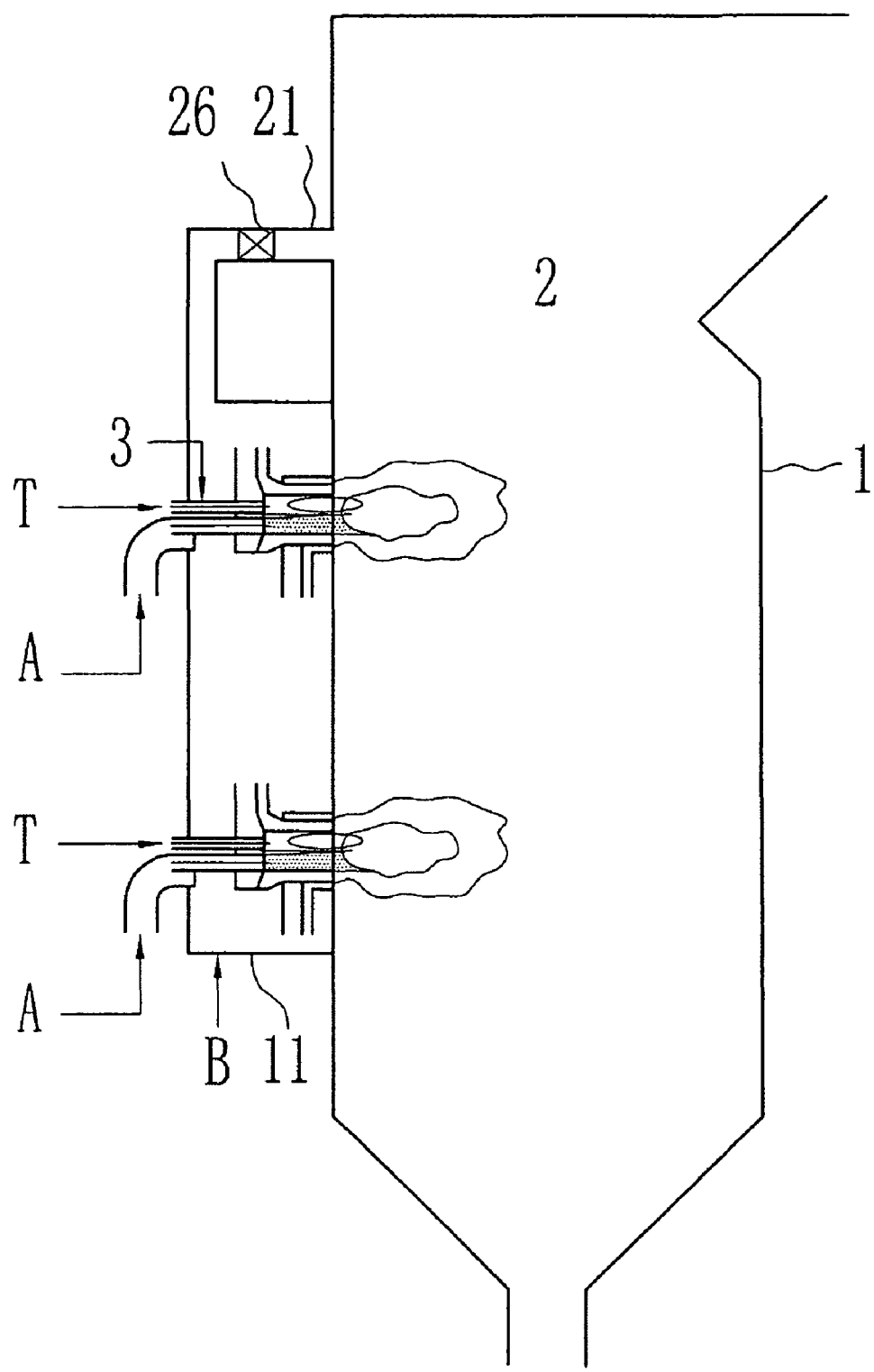
FIG. 1 shows a cross section of an embodiment of the invention for creating a concentrated fuel stream and performing heating in the burner and combustion in a combustion chamber.
Figure 2:
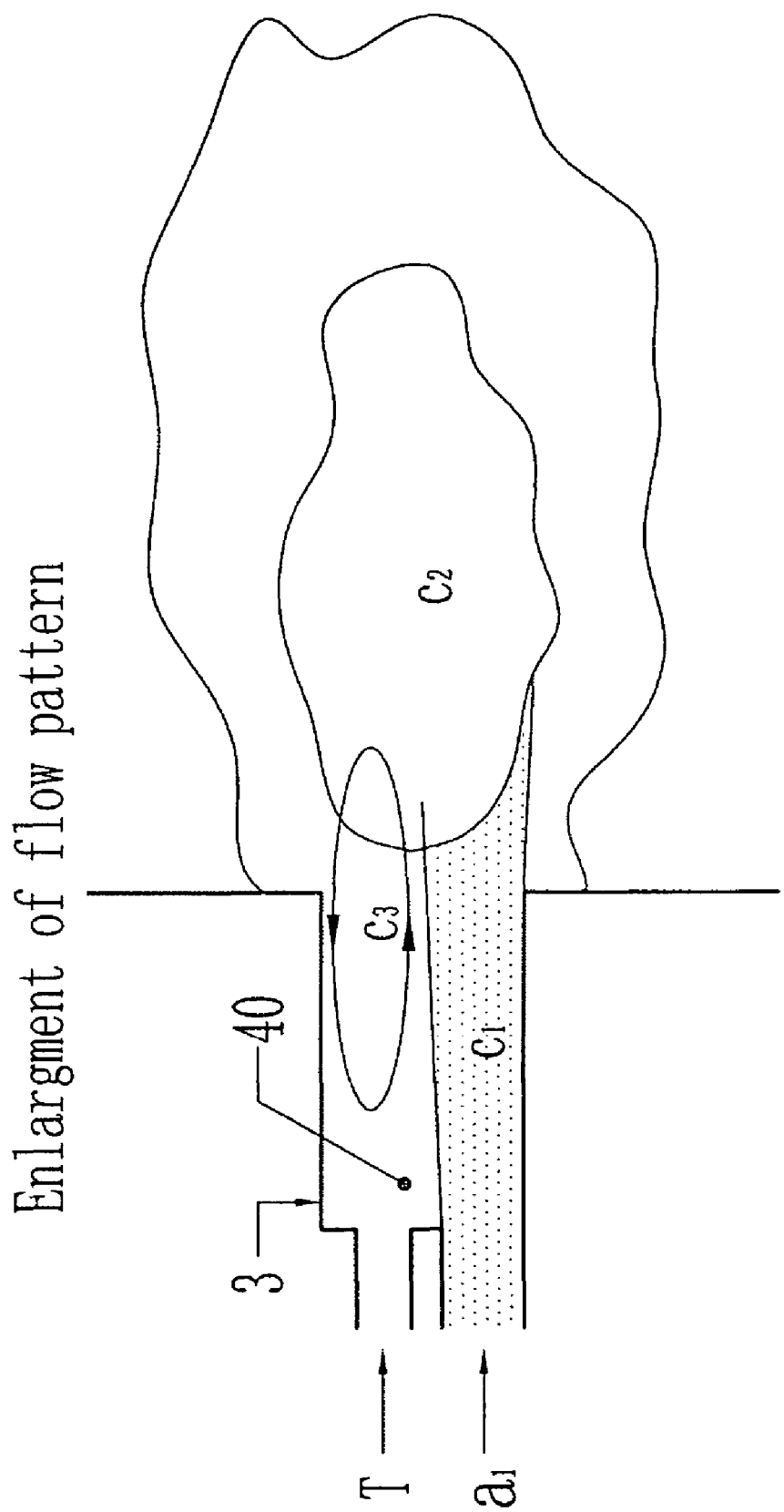
FIG. 2 shows the flow pattern for reflow and heating of the fuel stream.
Figure 3:
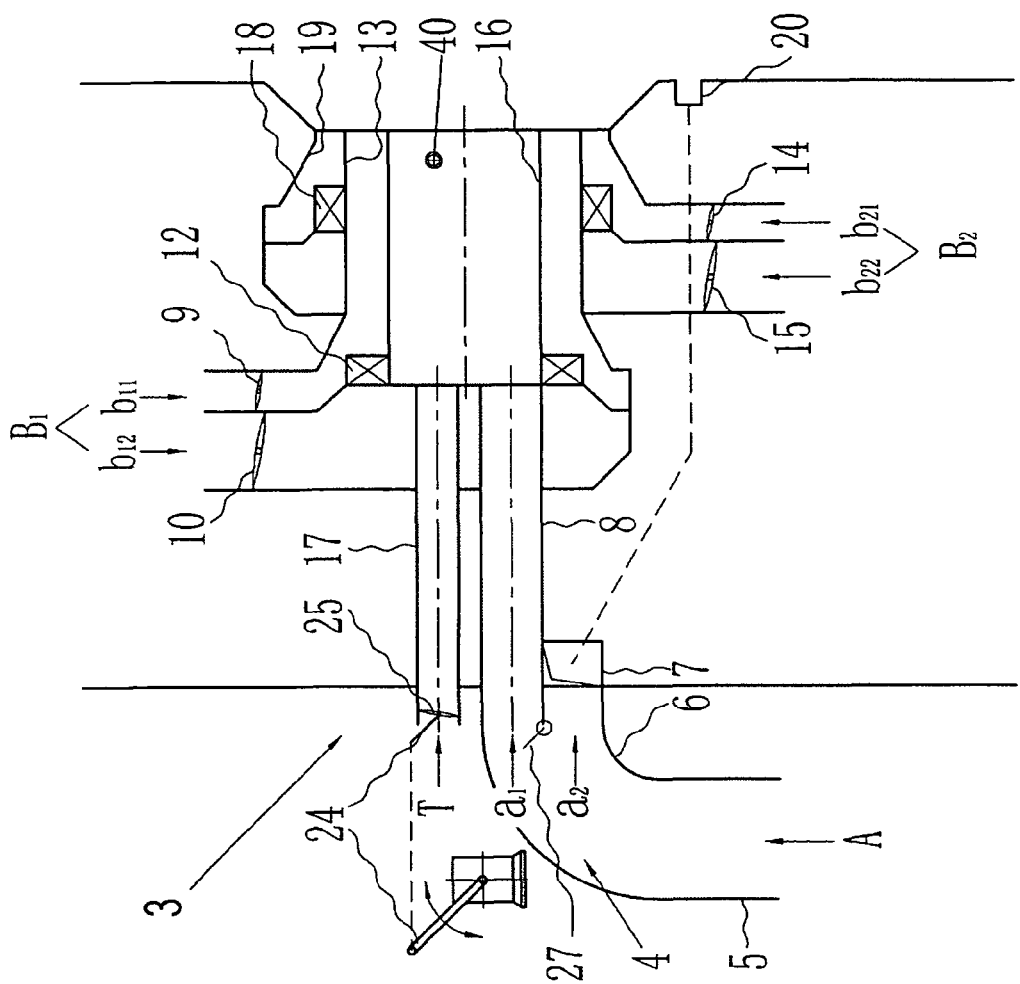
FIGS. 3 and 4 show cross section of a burner of the embodiment shown in FIG. 1
Figure 4:
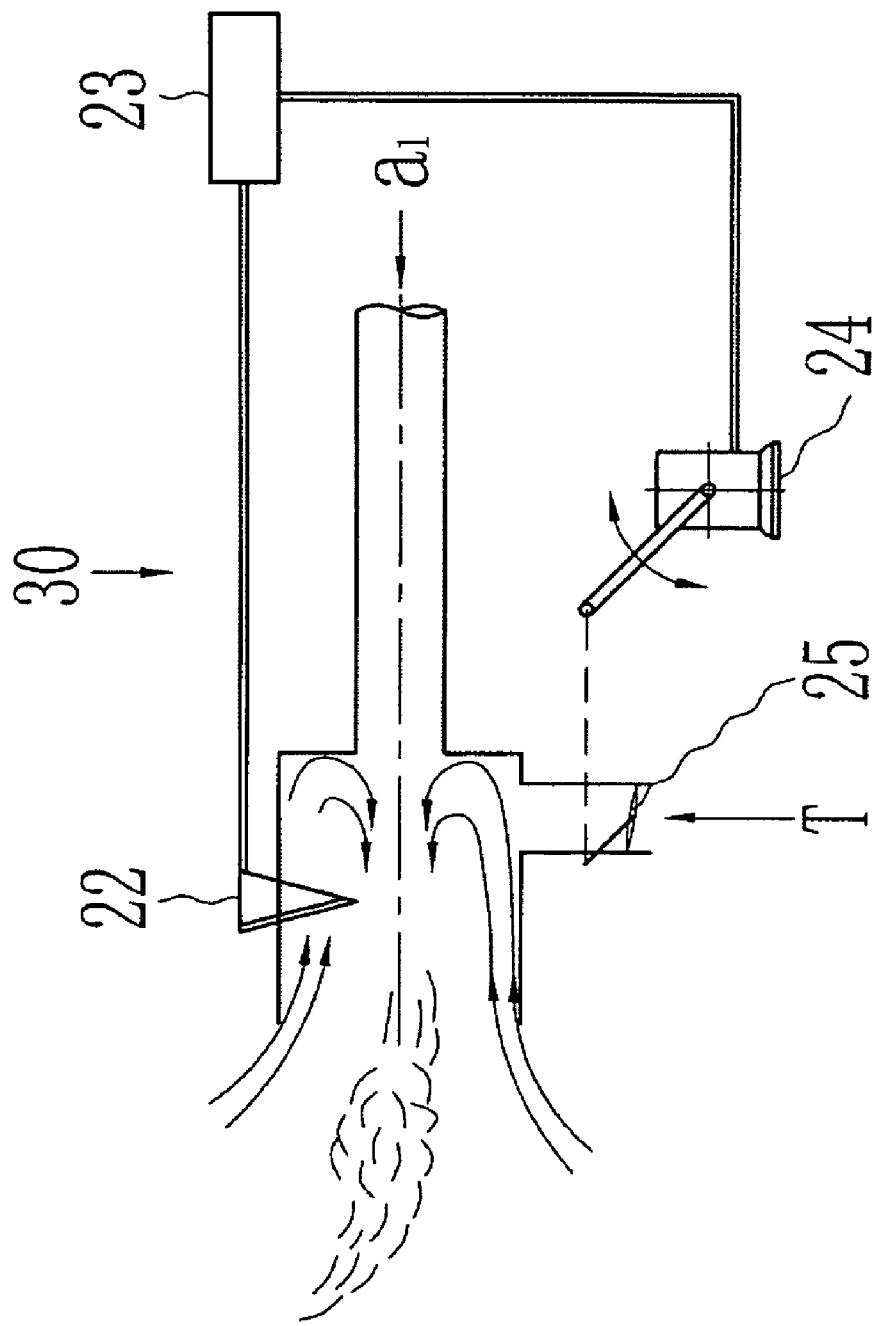

FIG. 1 shows a combustion system includes a burner 3 and a combustion device 1 having a chamber 2. The combustion device of the present invention can be any apparatus within which combustion takes place. Typical combustion devices include furnaces and boilers. A burner 3 is mounted on a sidewall or at a wall corner of the combustion device 1 and feeds fuel solids and air from sources outside the combustion device 1 into the combustion chamber 2 of the combustion device 1. Typical fuels include pulverized hydrocarbon solids, an example of which is pulverized coal or petroleum coke.

In some embodiments of the present invention, fuel and oxidant, typically air, are supplied to the combustion system as a primary air/fuel stream A, and a secondary air/fuel stream for an aerodynamic control of the mixing between the fuel and the air. In the primary air/fuel stream A, the air may be supplied with a stoichiometric ratio less than 1. The air used to complete the combustion of the fuel may be supplied to the combustion device 1 as the secondary stream B ($=B_1+B_2$) and/or as an over-fire air as shown in FIGS. 1 to 4.

As shown in FIGS. 1 and 3 to 6, the burner 3 is comprised of an injector 8, 16 for a concentrated air/fuel stream $a_1$, a secondary stream injector 13, 19, and an automatic control unit 30. Preferably, a solid-gas separator 4 is placed in front of the injector 8 for the concentrated air/fuel stream $a_1$ to separate the primary air/fuel stream A into a concentrated stream $a_1$ and a diluted fuel stream $a_2$. The separator 4 is preferred to be a bent three-way separator but should not be limited to a bend separator. The bent three-way separator 4 includes a primary-stream inlet pipe 5, a bent pipe 6, a feeding pipe 7 for a diluted stream $a_2$, and a feeding pipe 8 for the concentrated fuel stream $a_1$. Preferably, the winding angle of the bent pipe 6 is between 60° and 120°. The ratio of the inner radius of the pipe 8 for the concentrated fuel stream to the inner radius of the pipe 7 for the diluted fuel stream is between 0.5 and 2.0.

The primary air/fuel stream A from a pulverizing system (not shown in the figure) may be fed from the inlet pipe 5 through the bent 3-way separator 4 at a velocity. Fuel powders can be concentrated on the outer bend of the separator 4 by the design of the separator 4 with a specified radius and a winding angle to match the flow velocity. This separates the primary stream A into the concentrated stream $a_1$ in the outer region of the bend and a diluted stream $a_2$ in the inner region of the bend. The concentrated stream $a_1$ is fed to the burner 3 through a feeding pipe 8. Through a feeding pipe 7, the diluted stream $a_2$ is fed through a port 20 into the combustion device 1 at a location close to the burner 3. The angle in the exit direction of the separator 4 can be adjusted. A typical primary stream A contains about 1.25 to 4.0 kg of air for 1 kg of fuel solids, which represents about 10 to 35% of the stoichiometric combustion air required for a complete combustion of the fuel.

The flow rate and concentration of the concentrated stream $a_1$ or diluted stream $a_2$ can be controlled by adjusting a flap valve 27 disposed between the feeding pipe 8 for the concentrated stream $a_2$ and the feeding pipe 7 for the diluted stream $a_2$. Alternatively, some other arrangement may be made to control the flow rate and concentration of the concentrated stream $a_1$ or diluted stream $a_2$.

The secondary stream is from the secondary stream windbox 11 (FIG. 1). Preferably, the secondary stream is fed using two passages: an inner secondary stream passage $B_1$ and an outer secondary stream passage $B_2$. The inner secondary stream passage $B_1$ includes a throttle 9 for the straight-flow secondary stream, a throttle 10 for the swirling-flow secondary stream, an air deflector 12, and a secondary stream spurt pipe 13. The outer secondary stream passage $B_2$ includes a throttle 14 for the straight-flow secondary stream, a throttle 15 for the swirling-flow secondary stream, an air deflector 18, and a secondary stream spurt pipe 19. Those components are placed concentrically along the axis of the fed line 16 of the concentrated stream $a_1$ if the components are in a circular or cylindrical shape.

Fed from the windbox 11, the inner secondary stream $B_1$ is then separated into two streams by adjusting the throttles 9 and 10. Of them, the first stream $b_{11}$ is a straight-flow air, the second stream $b_{12}$ is a swirling flow air produced by the axial air deflector 12. Adjusting the throttles 9 and 10 allows a desirable swirling strength. Fed from the windbox 11, the outer secondary stream $B_2$ is then separated into two streams by adjusting throttles 14 and 15. Of them, the first stream $b_{21}$ is a straight-flow air, the second stream $b_{22}$ is a swirling flow produced by the axial air deflector 18. Adjusting the throttles 14 and 15 allows a desirable swirling strength. A typical secondary stream B contains about 3.5 to 8.0 kg of air for 1 kg of fuel, which represents about 65 to 90% of the stoichiometric combustion air required for a complete combustion of anthracite, bituminous coals and oil coke. The swirl strength is controlled by adjusting throttles 9 and 10 and 14 and 15. Preferably, a swirl number, as defined in "Combustion Aerodynamics", J. M. Beer and N. A. Chigier, Robert E. Krieger Publishing Company, Inc., 1983, is 0.1 to 2.0.

Preferably, an over-fire air is fed through an over-fire-air port 21 into the combustion device 1 to make the entire combustion zone inside the combustion device 1 fuel-rich and supplies more oxygen to help a complete combustion of the fuel. The volume percentage of the over-fire-air may be between 0 and 30% of the total air sent to the combustion device 1 that is required for a complete combustion of the fuel.

In a preferred embodiment, the concentrated stream enters the burner chamber 40 and forms a fuel-rich zone $C_1$ where the stoichiometric ratio is between 0.08 and 0.25. A reflow of high-temperature gas is introduced into the burner 3 from the combustion chamber 2 to heat rapidly the concentrated stream to devolatilize volatiles and bound nitrogen. And combustion takes place between the fuel solids and the combustion air sequentially, producing a flame $C_2$. The secondary stream and sometimes the over-fire air are injected into the combustion chamber 2 to complete combustion. The reflow is caused by the relatively lower pressure caused by the injection of the concentrated stream $a_1$ at a relatively high velocity compared to the velocity of gases inside the combustion device 1.

The rapid heating of the concentrated fuel stream in the fuel-rich zone $C_1$ generates a volatile fuel-rich zone. This significantly increases the combustibility of the fuel stream. Thus ignition is maintained and completed in a short time and range. And fuel combustion can be maintained at a high temperature. Rapid heating and devolatilization combined with high-temperature combustion under an atmosphere of reducing gases generate nitrogen. These exactly same combustion conditions also help the combustion of fuel particles and thus reduce the unburned carbon in the fly ash.

When the fuel concentration is higher or the ratio of air/fuel is smaller, the ignition time will be shorter; the combustion temperature will be higher; and the flame front is closer to the burner. When the flame front is too close to the mouth of the burner, for example, slagging may occur. This is especially important when the fuel type changes from a low grade fuel with a low content of volatiles such as anthracite coal to a fuel with a high content of volatiles such as the bituminous coal. In this case, the ratio of air/fuel should be increased to prevent slagging.

The invention uses a sensor 22 to monitor the change of at least one parameter in the burner 3 or in the combustion chamber 2. Representative parameters include temperature, pressure, and the content of a selected gas. The selected gas can be one or more of $O_2$, CO, $CO_2$, NOx, $N_2$, and HC. The sensor can be placed in the burner 3 or in the combustion chamber 2, or in an area where the burner 3 and the combustion device 1 intersect. For example, the temperature sensor may be placed at or near a location where slagging is likely to take place. The temperature signal is sent to a closed-loop controller 23.

A typical controllers may be a PID (proportional-integral-differential) controller or a DCS (distributed control system) controller. The signal is compared to a pre-set value. If the detected temperature signal is larger than the pre-set value, meaning that the combustion temperature is too high or that the flame front is closer than the desired distance from the burner, the controller sends a command to the servo-motor 24, which then varies the opening of the valve 25 to reduce combustion temperature. Specifically, the controller may allow more tertiary air T (directly from the atmosphere or from a supplying source) into the burner 3. The additional tertiary air dilutes the fuel stream and reduces combustion gas reflow, increasing the distance between the burner 3 and the flame front. The control process automatically continues until the sensed temperature is the same or sufficiently close to the desired value. The automatic control allows the combustion system to be adaptable to different types of fuel and to reduce NOx emissions.

Preferably, the total amount of air fed to the combustion device 1, i.e., the sum of the air in the primary air A ($=a_1+a_2$), the secondary stream B ($=B_1+B_2$), and the tertiary air T, is between 90 to 125% of the stoichiometric air required for complete the combustion. Preferably, the air through the over-fire-air port 21 is about 0 to 30% of the total air sent to the combustion device 1. The amount of over-fire air can be controlled by adjusting the opening of the over-fire air valve 26.

Preferably, the tertiary air T is controlled such that the flame front is at a location between 100 mm and 1400 mm from the burner. In some cases, when the flame front is closer to the burner than this preferred range, slagging tends to occur.

The amount of air fed to the burner 3 and the arrangement of the aerodynamics of the air preferably is used to establish a stoichiometric ratio in the fuel-rich zone of the flame $C_2$ that is less than 0.75. The amount of air in the concentrated stream $a_1$ is preferably less than 30% of the stoichiometric amount required for the complete combustion of the solid fuel. More preferably, the amount should be less than 20% of the stoichiometric amount.

Both the NOx emission and the unburned carbon in the ash depend on the stoichiometric ratio in the fuel-rich zone $C_1$ and the fuel-rich flame zone $C_2$ and on the heating rate or the temperature rising rate of the fuel-rich zone $C_1$. For example, if the primary stream A is directly sent to the burner 3, the heat required to heat the stream to the ignition temperature is about or more than two times of that required to heat the concentrated stream $a_1$. As a result, the ignition of the fuel stream will be delayed, and the combustion may not be completed in the combustion system. At the same time, NOx emission is increased dramatically when the stoichiometric ratio is larger than 1.0.

In a preferred embodiment, the present invention creates and maintains a controlled fuel rich flame by: concentrating the conventional primary stream; then fast heating the concentrated stream using reflowed combustion gases inside the burn 3 (the reflow is caused by the negative pressure induced by the relatively high-speed concentrated fuel stream itself); and controlling the reflow using a control system. The flame of the highly concentrated fuel stream is preferably maintained by the controlled reflow, allowing a stoichiometric ratio well below the original primary air values.

The burner 3 preferably contains a structure, such as a separator 4, which separates the conventional primary air into a concentrated stream A and a diluted stream B. The separator 4 is based on an inertia design where the density difference between the fuel and the air is used to separate the two substances. The fuel powders tend to retain their flow direction, while it is easier for the air to change its direction and speed. The separator 4 used in the invention is a bent pipe, while any other solid-gas separator can be used to substitute the bent separator.

Fuel injectors in burners generally have a circular cross section, an annual cross section (formed by two concentric pipes), or a square or rectangular cross-section (for example, injectors in tangentially fired boiler). These designs or layouts fulfill two functions for the present invention: feeding fuel streams into the combustion device, and generating the reflow of high-temperature gases back into the burner that is used to heat the concentrated stream. FIGS. 5 and 6 show some representative designs that perform such functions. The present invention, nonetheless, includes all designs or layouts that feed the fuel and generate re-flow of high-temperature gases from the combustion device 1. These designs can be used in wall-fired boilers, the tangentially fired boiler, and the down-fired boilers.

FIG. 5 shows some fuel injectors that are without a tertiary air inlet. It should be pointed out that while some embodiments of the present invention use the tertiary air to control the pressure in the low pressure reflow zone, other embodiments of the present invention also include a burner that does not use the tertiary air. In FIG. 5a, the feeding pipe 8 for a concentrated fuel stream is at the centerline of a burner pipe 16. In FIG. 5b, the feeding pipe 8 is located off the centerline of the burner pipe 16. In FIG. 5c, the feeding pipe 8 is arranged around the burner pipe 16. In FIG. 5d to 5g, the feeding pipe 8 is composed of two parts: a straight section and a concentric section, and inside the burner pipe 16, there could include a solid. When the tertiary air is not used to control the pressure of the low-pressure zone in the burner 3, the amount and/or content of the concentrated fuel stream flowing into the burner may be controlled to adjust the pressure inside the burner and/or to adjust the heating and the weight ratio of fuel/air in the burner 3.

FIG. 6 shows some fuel injectors that have a tertiary air inlet. In FIG. 6a, the tertiary air inlet is located on a side wall of the burner pipe 16. Preferably, a tertiary-air pipe 17 is located in the first two thirds of the burner pipe 16 (from the fuel-stream entrance). In FIG. 6b, the tertiary air inlet 17 is located on the front surface (herein the front is the entrance of the fuel stream) of the burner pipe 16.

The burner pipe 16 and the tertiary-air pipe 17 can be of any shape. Representative shapes are cylindrical, cubic, prismatic, cone-shaped, elliptic, and frustum-shaped of pyramid. Additionally, all feeding pipes 8 and burner pipes 16 shown in FIG. 5 can be used as fuel injector with tertiary air. The preferable shapes are cylindrical, cuboid, and prismatic. There can be any number of feeding pipes for the concentrated fuel stream and tertiary-air pipes. The tertiary pipe 17 can be at any angle with respect to the burner centerline.

The invention claimed is:

1. A method of combustion for pulverized hydrocarbonaceous fuel, the method comprising:
   injecting a concentrated fuel and air stream into a burner, causing a low-pressure zone;
   directing a flow of a high-temperature combustion gas from a combustion chamber into the low-pressure zone in the burner;
   mixing the high-temperature combustion gas with the injected concentrated stream to heat the injected concentrated stream, and injecting the heated concentrated stream from the burner to the combustion chamber, wherein the concentrated stream is rapidly devolatilized and combusted in a flame that has a fuel-rich flame zone;
   sensing a combustion parameter; and
   based on the sensed combustion parameter, controlling a pressure in the low-pressure zone to control combustion to achieve at least one of a desired NOx reduction and a desired distance from the burner to a flame front.

2. A method according to claim 1, therein the step of controlling the pressure of the low-pressure zone includes controlling a tertiary air fed into the low pressure zone to control the pressure of the low-pressure zone.

3. A method according to claim 2, wherein a feeding pipe for feeding the tertiary air is located in the first two-third of the burner measured from its entrance for the concentrated stream.

4. A method according to claim 1, wherein the step of controlling the combustion includes controlling the flow rate of the high-temperature combustion gas from the combustion chamber into the low-pressure zone in the burner.

5. A method according to claim 1, wherein the step of controlling the combustion includes controlling at least one of the flow rate and concentration of the injected concentrated fuel and air stream.

6. A method according to claim 1, wherein the concentrated stream is heated to a temperature of 700° C. to 1200° C. in a distance between 250 mm and 1950 mm as measured from the entrance of the burner for the high-temperature gas.

7. A method according to claim 1, wherein the concentrated stream has a weight ratio of air to fuel in the range of 0.4 to 2.2.

8. A method according to claim 1, wherein the concentrated stream has a weight ratio of air to fuel in the range of 0.7 to 1.8.

9. A method according to claim 1, wherein the concentrated stream is injected into the burner at a speed from 10 to 60 m/s.

10. A method according to claim 1, wherein the concentrated stream is injected into the burner at a speed from 15 to 50 m/s.

11. A method according to claim 1, wherein a cross-sectional area of the injected concentrated stream at the entrance to the burner is a fraction of a cross-sectional area of the burner.

12. A method according to claim 11, wherein the cross-sectional area of the injected concentrated stream at the entrance to the burner is less than 50% of the cross-sectional area of the burner.

13. A method according to claim 1, wherein the fuel is at least one of coal and oil coke.

14. A method according to claim 1, further comprising separating a primary fuel and air stream into the concentrated fuel and air stream and a diluted fuel and air stream, and feeding the diluted stream into the combustion chamber.

15. A method according to claim 14, wherein the step of controlling the combustion includes controlling the feeding of the diluted stream into the combustion chamber.

16. A method according to claim 14, wherein the separating of the primary fuel and air stream into the concentrated stream and the diluted stream is performed by a bent pipe.

17. A method according to claim 16, wherein the winding angle of the bent pipe is between 60° and 120°.

18. A method according to claim 14, wherein the primary stream contains 10% to 35% of stoichiometric air.

19. A method according to claim 1, wherein the combustion parameter includes at least one of a pressure sensor, a temperature sensor, and a chemical sensor for sensing the content of a gas.

20. A method according to claim 1, wherein the sensing step is performed by a sensor that is placed in the burner or combustion chamber or embedded in a wall of the burner or combustion chamber.

21. A method according to claim 1, further comprising feeding an over-fire air into the combustion chamber, wherein the over-fire air is 0 to 30% of the total air fed to the combustion chamber.

22. A method according to claim 21, wherein the step of controlling the combustion includes controlling the feeding of the over-fire air.

23. A method according to claim 1, further comprising feeding a secondary stream, wherein the secondary stream contains 65% to 90% of stoichiometric air.

24. A method according to claim 23, further comprising feeding the secondary stream to the combustion chamber adjacent to the periphery of the exit of the burner for the concentrated stream.

25. A method according to claim 23, wherein the step of controlling the combustion includes controlling the feeding of the secondary stream.

26. A method according to claim 23, wherein the secondary stream is one of a straight flow or a swirling flow.

27. A method according to claim 26, further comprising dividing the swirling secondary stream into an inner secondary stream and an outer secondary stream.

28. A method according to claim 27, wherein the swirling strength is between 0.1 and 2.0.

29. A method according to claim 1, wherein the step of controlling combustion includes controlling combustion to maximize NOx reduction without impermissible slagging.

30. A combustion system for pulverized hydrocarbonaceous fuel, the device comprising:

a burner that is to receive a concentrated fuel and air stream, the burner configured to have a low-pressure zone caused by the concentrated fuel and air stream;
a combustion chamber that is connected to the burner to send a flow of a high-temperature combustion gas into the low-pressure zone to heat the concentrated stream;
a sensor for sensing a combustion parameter; and
a controller for controlling a pressure in the low-pressure zone to control combustion based on the sensed combustion parameter to achieve at least one of a desired NOx reduction and a desired distance from the burner to a flame front.

31. A combustion system according to claim 30, comprising a separating device that is designed to separate a primary fuel and air stream into the concentrated fuel and air stream and a diluted fuel and air stream, wherein the separating device is connected to the burner to supply the concentrated stream to the burner.

32. A combustion system according to claim 30, wherein the controller controls combustion to maximize NOx reduction without impermissible slagging.

33. A method according to claim 1, wherein the step of controlling combustion includes controlling combustion to achieve the desired distance from the burner to the flame front.

34. A method accord to claim 33, wherein the step of controlling combustion to achieve the desired distance includes controlling a tertiary air fed into the low-pressure zone.

35. A system according to claim 30, wherein the controller controls combustion to achieve the desired distance from the burner to the flame front.

36. A system accord to claim 35, wherein the controller controls the desired distance by controlling a tertiary air fed into the low-pressure zone.

37. A method of combustion for pulverized hydrocarbonaceous fuel, the method comprising:

injecting a concentrated fuel and air stream into a burner, causing a low-pressure zone;
directing a flow of a high-temperature combustion gas from a combustion chamber into the low-pressure zone in the burner;
mixing the high-temperature combustion gas with the injected concentrated stream to heat the injected concentrated stream, and injecting the heated concentrated stream from the burner to the combustion chamber, wherein the concentrated stream is rapidly devolatilized and combusted in a flame that has a fuel-rich flame zone;
sensing a combustion parameter; and
based on the sensed combustion parameter, controlling a pressure in the low-pressure zone to control combustion to reduce slagging.

* * * * *